United States Patent
Alspach et al.

(10) Patent No.: US 11,408,788 B2
(45) Date of Patent: Aug. 9, 2022

(54) VARIABLE GEOMETRY AND STIFFNESS CONTROL FOR FLUID FILLED SENSOR

(71) Applicant: TOYOTA RESEARCH INSTITUTE, INC., Los Altos, CA (US)

(72) Inventors: Alexander Alspach, Somerville, MA (US); Naveen Suresh Kuppuswamy, Arlington, MA (US); Avinash Uttamchandani, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 206 days.

(21) Appl. No.: 16/836,390

(22) Filed: Mar. 31, 2020

(65) Prior Publication Data
US 2021/0302248 A1 Sep. 30, 2021

(51) Int. Cl.
*G01L 5/00* (2006.01)
*G01L 1/04* (2006.01)
*B25J 13/08* (2006.01)

(52) U.S. Cl.
CPC .......... *G01L 5/0066* (2013.01); *B25J 13/084* (2013.01); *G01L 1/04* (2013.01)

(58) Field of Classification Search
CPC ................ B25J 19/021; B25J 19/0095; G01L 5/226–228; G01L 1/24–241
See application file for complete search history.

(56) References Cited

U.S. PATENT DOCUMENTS 4,102,210 A * 7/1978 Couston ................ G01L 9/0044
338/42

4,574,811 A * 3/1986 Stephens ................. G01L 19/14
600/488

(Continued)

FOREIGN PATENT DOCUMENTS

| WO | 2009124211 A1 | 10/2009 |
|----|---------------|---------|
| WO | 2013173624 A2 | 11/2013 |

OTHER PUBLICATIONS

N. Kuppuswamy, A. Castro, C. Phillips-Grafflin, A. Alspach and R. Tedrake, "Fast model-based contact patch and pose estimation for highly deformable dense-geometry tactile sensors," in IEEE Robotics and Automation Letters. doi: 10.1109/LRA.2019.2961050 URL:http://ieeexplore.ieee.org/stamp/stamp.jsp?tp=&arnumber=8936859&isnumber=7339444 Pulbished Date Dec. 19, 2019.

(Continued)

*Primary Examiner* — Tran M. Tran
(74) *Attorney, Agent, or Firm* — Dinsmore & Shohl LLP (57) ABSTRACT

Devices, systems, and methods for adjusting the high flex point of a deformable sensor are disclosed herein. A deformable sensor may include an enclosure comprising a housing and a deformable membrane coupled to an upper portion of the housing, where the enclosure is configured to be filled with a medium, a contact mechanism coupled to the housing and selectively adjustable such that adjusting a position of the contact mechanism causes a change in a location of a high flex point of the deformable membrane, and an internal sensor, disposed within the enclosure, having a field of view configured to be directed through the medium and toward a bottom surface of the deformable membrane, where the internal sensor is configured to output a deformation region within the deformable membrane when placed in contact an object.

20 Claims, 9 Drawing Sheets

(56) References Cited

U.S. PATENT DOCUMENTS

| | | | | |
|---|---|---|---|---|
| 5,355,712 A * | 10/1994 | Petersen | | G01L 9/0042 73/1.38 |
| 5,917,647 A * | 6/1999 | Yoon | | G02B 26/0841 359/298 |
| 5,978,128 A * | 11/1999 | Yoon | | G02B 26/0841 359/298 |
| 6,178,033 B1 * | 1/2001 | Ford | | B81B 3/0035 359/247 |
| 7,116,463 B2 * | 10/2006 | Wu | | G02B 5/32 359/291 |
| 8,567,257 B2 * | 10/2013 | Van Steenberge | | G01L 9/0079 73/800 |
| 8,723,832 B2 * | 5/2014 | Ciesla | | G06F 3/0202 345/173 |
| 8,885,272 B2 * | 11/2014 | Penniman | | G02B 7/04 359/824 |
| 9,027,417 B2 * | 5/2015 | Sato | | G01L 1/04 73/862.642 |
| 9,080,918 B2 * | 7/2015 | Fishel | | G01L 5/228 |
| 9,120,230 B2 | 9/2015 | Lipson et al. | | |
| 9,130,485 B2 | 9/2015 | Prahlad et al. | | |
| 9,157,843 B2 * | 10/2015 | Shen | | G01N 3/20 |
| 9,239,623 B2 * | 1/2016 | Yairi | | G06F 3/016 |
| 9,399,572 B2 * | 7/2016 | Burchard | | G01L 27/007 |
| 9,502,995 B2 * | 11/2016 | Najafi | | B81B 3/0021 |
| 9,513,178 B2 * | 12/2016 | Tar | | G01L 1/248 |
| 9,625,333 B2 * | 4/2017 | Jentoft | | G01L 1/02 |
| 9,760,172 B2 * | 9/2017 | Ray | | F15B 15/10 |
| 9,802,314 B2 * | 10/2017 | Yamane | | B25J 9/1676 |
| 9,910,263 B2 * | 3/2018 | Bolis | | G02B 26/004 |
| 9,981,382 B1 | 5/2018 | Strauss et al. | | |
| 10,132,706 B2 * | 11/2018 | Perkins | | G01L 19/0672 |
| 10,197,482 B2 * | 2/2019 | Gao | | G09G 3/006 |
| 10,345,574 B2 * | 7/2019 | Bolis | | G02F 1/00 |
| 10,365,172 B2 * | 7/2019 | Tomita | | B25J 13/084 |
| 10,459,537 B2 * | 10/2019 | Barbier | | G01L 5/226 |
| 10,488,284 B2 * | 11/2019 | Jentoft | | G01L 1/02 |
| 10,549,428 B2 * | 2/2020 | Alspach | | G01L 1/04 |
| 10,668,627 B2 * | 6/2020 | Alspach | | G01L 1/04 |
| 10,775,935 B2 * | 9/2020 | Kocovski | | G06F 1/16 |
| 10,908,033 B2 * | 2/2021 | Lim | | G01L 1/20 |
| 2002/0050170 A1 * | 5/2002 | Petrovic | | G01L 19/147 73/715 |
| 2011/0303016 A1 * | 12/2011 | Gutierrez | | G01D 15/00 73/719 |
| 2012/0240691 A1 * | 9/2012 | Wettels | | G01L 1/24 73/862.624 |
| 2013/0247644 A1 * | 9/2013 | Swoboda | | A61B 5/6868 73/1.08 |
| 2015/0260597 A1 * | 9/2015 | Pagani | | G01L 9/0052 73/727 |
| 2017/0219450 A1 * | 8/2017 | Swoboda | | G01L 27/002 |
| 2019/0091871 A1 | 3/2019 | Alspach et al. | | |
| 2020/0055190 A1 * | 2/2020 | Crothers | | B25J 9/009 |
| 2020/0191704 A1 * | 6/2020 | Redmond | | A41D 19/01541 |

OTHER PUBLICATIONS

Soft-bubble: A highly compliant dense geometry tactile sensor for robot manipulation URL: https://arxiv.org/ftp/arxiv/papers/1904/1904.02252.pdf Published Date: Apr. 3, 2019.

* cited by examiner

VARIABLE GEOMETRY AND STIFFNESS CONTROL FOR FLUID FILLED SENSOR

TECHNICAL FIELD

The present specification generally relates to deformable sensors. More specifically, the present concept relates to deformable sensors and methods of adjusting the geometry and/or the stiffness of the deformable sensors.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors. Furthermore, contact sensors generally include a fixed high flex point located in the center of the deformable membrane. However, with some irregularly shaped objects, it may be desirable to move the location of the high flex point so that it is not located in the center of the deformable membrane so that the bubble sensor can adequately sense the contour of irregularly shaped objects, pick up the irregularly shaped objects at a location that is more suitable for gripping, pick up the irregularly shaped object at a location that is less likely to deform or break, and/or the like.

Accordingly, there is a need to provide alternative deformable sensors having a deformable membrane where the geometry and stiffness are configurable.

SUMMARY

In one embodiment, a deformable sensor may include an enclosure comprising a housing and a deformable membrane coupled to an upper portion of the housing, where the enclosure is configured to be filled with a medium, a contact mechanism coupled to the housing and selectively adjustable such that adjusting a position of the contact mechanism causes a change in a location of a high flex point of the deformable membrane, and an internal sensor, disposed within the enclosure, having a field of view configured to be directed through the medium and toward a bottom surface of the deformable membrane, where the internal sensor is configured to output a deformation region within the deformable membrane when placed in contact an object.

In some embodiments, a system for adjusting a high flex point of a deformable sensor includes an enclosure comprising a housing and a deformable membrane coupled to an upper portion of the housing, the enclosure configured to be filled with a medium, a contact mechanism coupled to the housing and selectively adjustable such that adjusting a position of the contact mechanism causes a change in a location of a high flex point of the deformable membrane, an electromechanical control mechanism coupled to the contact mechanism and the housing, where the electromechanical control mechanism causes the contact mechanism to move, an internal sensor, disposed within the enclosure, having a field of view configured to be directed through the medium and toward a bottom surface of the deformable membrane, where the internal sensor is configured to output a deformation region within the deformable membrane as a result of contact with the object, and an electronic control unit communicatively coupled to the contact mechanism. The electronic control unit is configured to generate a control signal for controlling the electromechanical control mechanism and transmit the control signal to the electromechanical control mechanism, wherein the control signal causes the electromechanical control mechanism to adjust the position of the contact mechanism such that adjusting the position of the contact mechanism causes the high flex point of the deformable membrane to move from a first location to a second location.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our sense of touch allows us to determine the shape of an object without looking at the object. Furthermore, sense of touch provides information as to how to properly grasp and hold an object. Human fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects.

Embodiments of the present disclosure are directed to deformable/compliant contact and/or geometry sensors (hereinafter "deformable sensors") that not only detect contact with a target object, but also detect the geometry, pose and contact force of the target object. The deformable sensors described herein comprise a deformable membrane coupled to a housing that maintains a sensor capable of detecting displacement of the deformable membrane by contact with an object. The deformable sensors described herein not only detect the pressure or force that is applied to the deformable membrane, but can also detect the geometry and pose of the object. Thus, the deformable sensors described herein provide a robot (or other device) with a sense of touch when manipulating objects.

Deformability may refer, for example, to ease of deformation of deformable sensors. Spatial resolution may refer, for example, to how many pixels a deformable sensor has. The number of pixels may range from 1 (e.g., a sensor that simply detects contact with a target object) to thousands or millions (e.g., the dense sensor provided by a time-of-flight sensor having thousands of pixels) or any suitable number. Deformability may refer to how easily a deformable membrane deforms when contacting a target object. A deformable sensor may be of a high spatial resolution, with a dense tactile sensing sensor that is provided as an end effector of a robot, thereby giving the robot a fine sense of touch like a human's fingers. A deformable sensor may also have a depth resolution to measure movement toward and away from the sensor.

However, the deformable sensor is not limited to detecting the geometry, pose and contact force of a target object in contact with the deformable sensor. The deformable sensor may be configured to manipulate the position of an object or even lift an object when used in conjunction with a second manipulator or deformable sensor. However, as will be described in more detail herein, deformable sensors may include a deformable membrane having a dome shape. This dome shape results in a high flex point that is centrally located. The centrally located high flex point may not be desirable when determining the contour of irregularly shaped objects, manipulating or lifting an object having a low profile with respect to the surface, such as a coin laying on a table, picking up an object at a location that is less likely to deform or break, and/or the like.

However, changing the high flex point of the deformable membrane, for example to a location closer to the radial edge of the deformable membrane, can improve the ability of the deformable sensor to perform manipulation, lifting, and/or sensing operations.

Embodiments of the present disclosure include devices, systems, and methods for adjusting the high flex point of the deformable membrane of the deformable sensor. Furthermore, in some embodiments, the tension of the deformable membrane may also be adjusted to increase or decrease the rigidity or deformability of the deformable membrane. The following will now describe these devices, systems, and methods in more detail with reference to the drawings and where like numbers refer to like structures.

Figure 1:
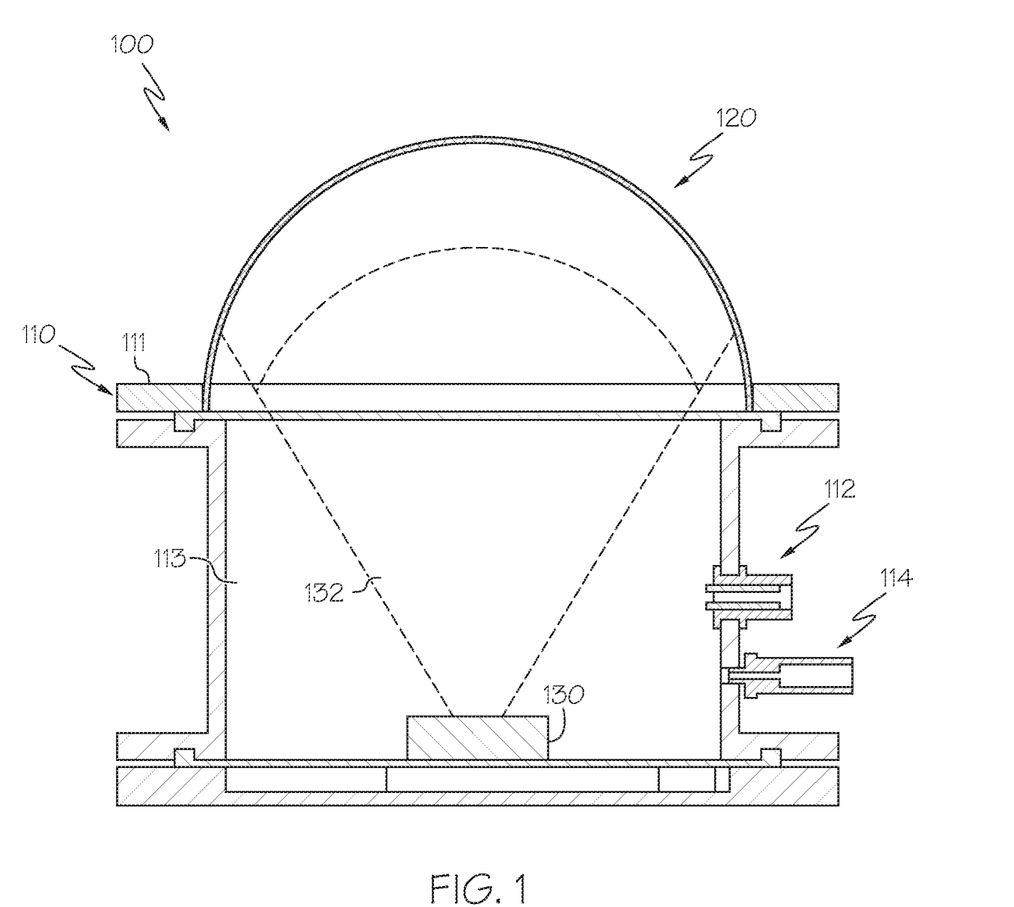
FIG. 1 schematically depicts a cross-section view of an example deformable sensor, according to one or more embodiments described and illustrated herein.
Figure 2A:
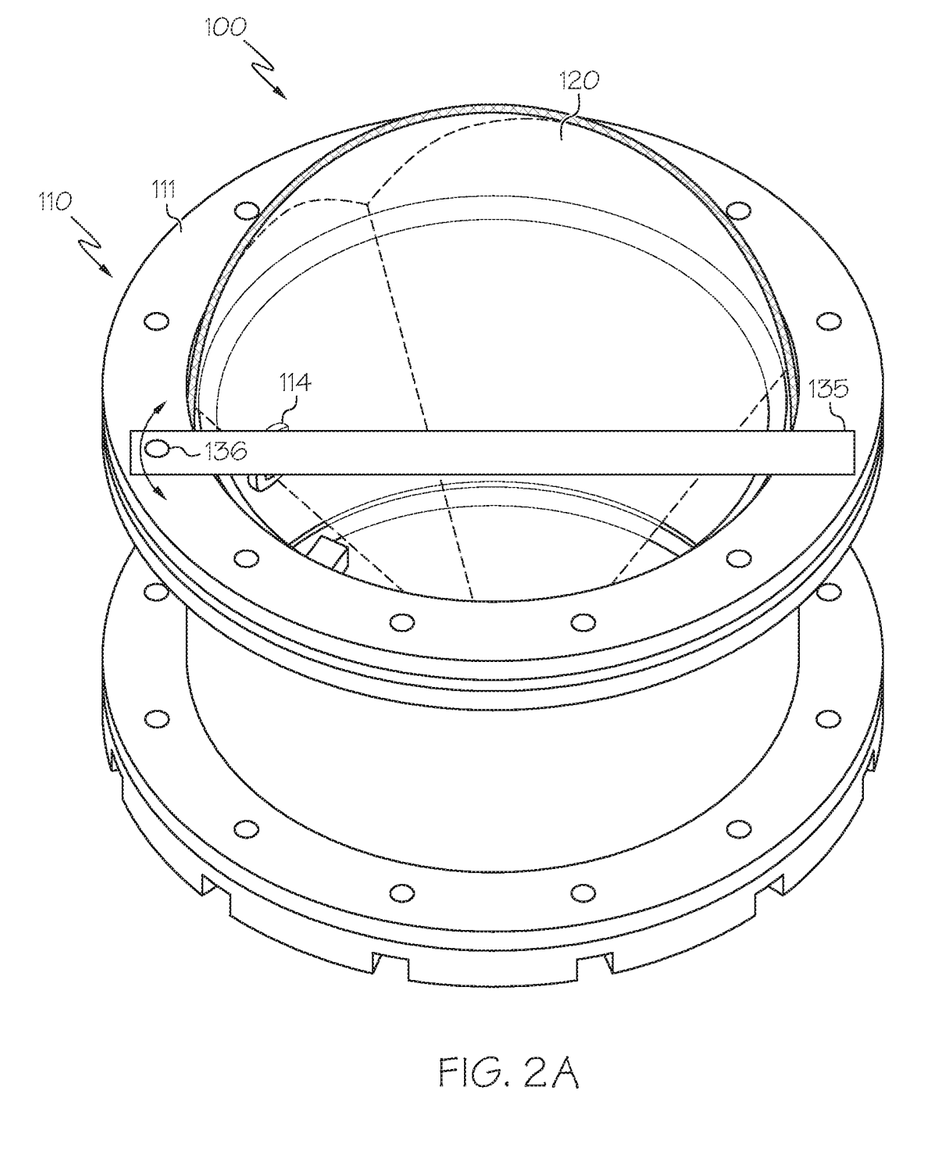
FIG. 2A schematically depicts a top perspective view of the example deformable sensor depicted by FIG. 1, according to one or more embodiments described and illustrated herein.

Referring now to FIGS. 1 and 2A, an example deformable sensor 100 is schematically illustrated. FIG. 1 is a front elevation view of the example deformable sensor 100 and FIG. 2A is a top perspective view of the example deformable sensor 100. FIGS. 1 and 2A depict differing embodiments. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. In another example, the medium is a gel, such as silicone or other rubber-like substance. In some embodiments, a substance such as solid silicone may be cast in a given shape before assembly of the deformable sensor 100. In various embodiments, the medium may be anything that is transparent to an internal sensor (discussed in more detail below), such as to a wavelength of a time of flight sensor. The medium may include clear/transparent rubbers in some embodiments. In other embodiments, the medium may be a liquid. In some examples, the deformable membrane 120 and the medium within the enclosure 113 may be fabricated of the same material, such as, without limitation, silicone. In some embodiments, the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100. In some embodiments, robots feature varying touch sensitivity due to varying spatial resolution and/or depth resolution.

Figure 4:
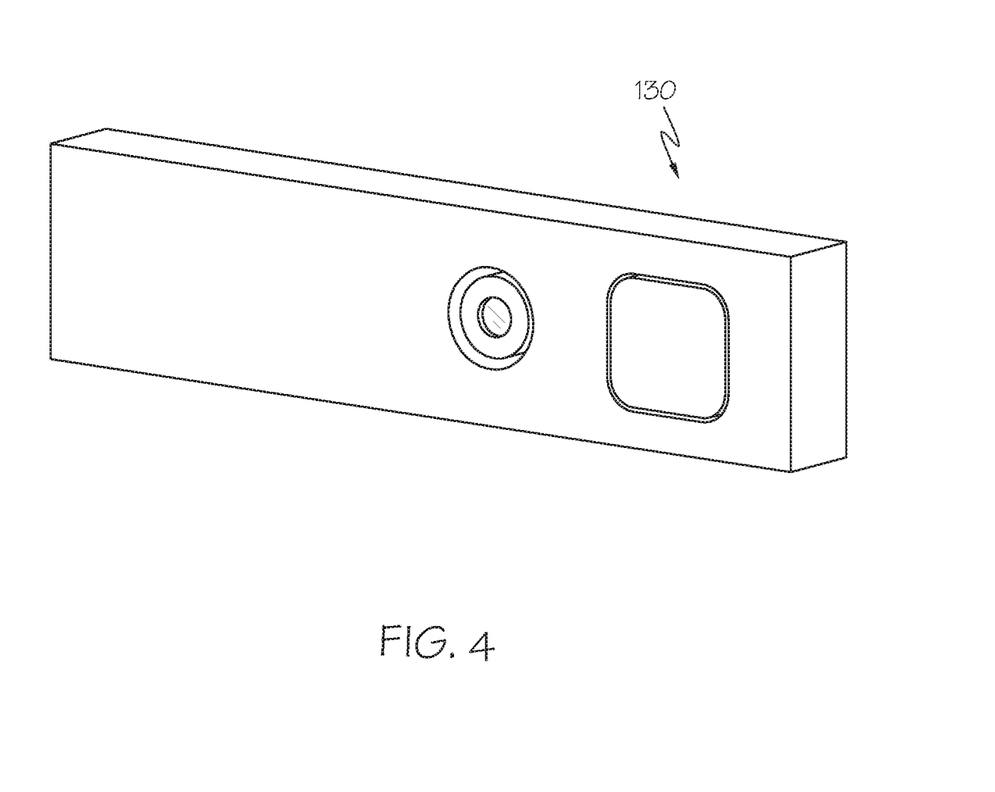
FIG. 4 schematically depicts an example time-of-flight sensor for use in a deformable sensor, according to one or more embodiments described and illustrated herein.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. In some embodiments, the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 130 may be changed. In some cases, low spatial resolution (e.g., one "pixel" that detects a single point's displacement) may be desired. In others, a sensitive time-of-flight sensor such may be used as a high spatial resolution internal sensor 130 that provides dense tactile sensing. Thus, the internal sensor 130 may be modular because the sensors may be changed depending on the application. FIG. 4 depicts an example time-of-flight sensor. A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3d scanners, single cameras (such as with dots or other patterns inside), or any other suitable type of visual detector. For example, the internal sensor 130 may be configured as a stereo-camera capable of detecting deflections of the deformable membrane 120 by an object.

Any suitable quantity and/or types of internal sensors 130 may be utilized within a single deformable sensor 100 in some embodiments. In some examples, not all internal sensors 130 within a deformable sensor 100 need be of the same type. In various embodiments, one deformable sensor 100 may utilize a single internal sensor 130 with a high spatial resolution, whereas another deformable sensor 100 may use a plurality of internal sensors 130 that each have a low spatial resolution. In some embodiments, the spatial resolution of a deformable sensor 100 may be increased due to an increase in the quantity of internal sensors 130. In some examples, a decrease in the number of internal sensors 130 within a deformable sensor 100 can be compensated for by a corresponding increase in the spatial resolution of at least some of the remaining internal sensors 130. As discussed in more detail below, the aggregate deformation resolution may be measured as a function of the deformation resolution or depth resolution among the deformable sensors 100 in a portion of a robot. In some embodiments, aggregate deformation resolution may be based upon a quantity of deformable sensors in a portion of the robot and a deformation resolution obtained from each deformable sensor 100 in that portion.

Referring again to FIG. 1, a conduit 114 may be utilized in the enclosure 113 to provide power and/or data/signals, such as to the internal sensor 130 by way of a conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments utilized wireless internal sensors 130 to transmit and/or receive data and/or power. In various embodiments where the medium is not a gas, such as silicone, the enclosure 113 and/or conduit 114 may not necessarily be airtight.

In some embodiments, the internal sensor 130 may include one or more internal pressure sensors (barometers, pressure sensors, etc., or any combination thereof) utilized to detect the general deformation of the deformable membrane 120 through the medium. In some embodiments the deformable sensor 100 and/or internal sensor 130 may receive/send various data, such as through the conduit 114 discussed above, wireless data transmission (Wi-Fi, Bluetooth, etc.), or any other suitable data communication protocol. For example, pressure within a deformable sensor 100 may be specified by a pressurization parameter and may be inversely proportional to the deformability of the deformable sensor 100. In some embodiments, the deformability of a deformable sensor 100 may be modified by changing pressure within the enclosure 113 or a material of the deformable membrane 120. In some embodiments, receipt of an updated parameter value may result in a real-time or delayed update (pressurization, etc.).

Still referring to FIG. 2A, the deformable sensor 100 further includes an example contact mechanism 135 coupled to the housing 110 of the deformable sensor. The example contact mechanism 135 depicted in FIG. 2A is an elongated lever having a first end rotatably coupled to the housing 110 and an elongated portion selectively positionable to contact the deformable membrane 120. The elongated lever may have a length that is equal to or greater than the diameter of the deformable sensor 100. The deformable sensor 100 may also include an electromechanical control mechanism 136. The electromechanical control mechanism 136 may be a drive motor, a linear actuator, or any other device capable of generating a driving force in response to a control signal. The electromechanical control mechanism 136 may be coupled to the contact mechanism 135 and the housing 110. The electromechanical control mechanism 136 causes the contact mechanism 135 to move when a control signal transmitted from an electronic control unit 330, for example, is received. The electromechanical control mechanism 136 may causes the contact mechanism 135 to contact the deformable membrane 120. In some embodiments, as the contact mechanism 135 moves into contact with the deformable membrane 120 the high flex point of the deformable membrane 120 moves from a first location to a second location.

Figure 2B:
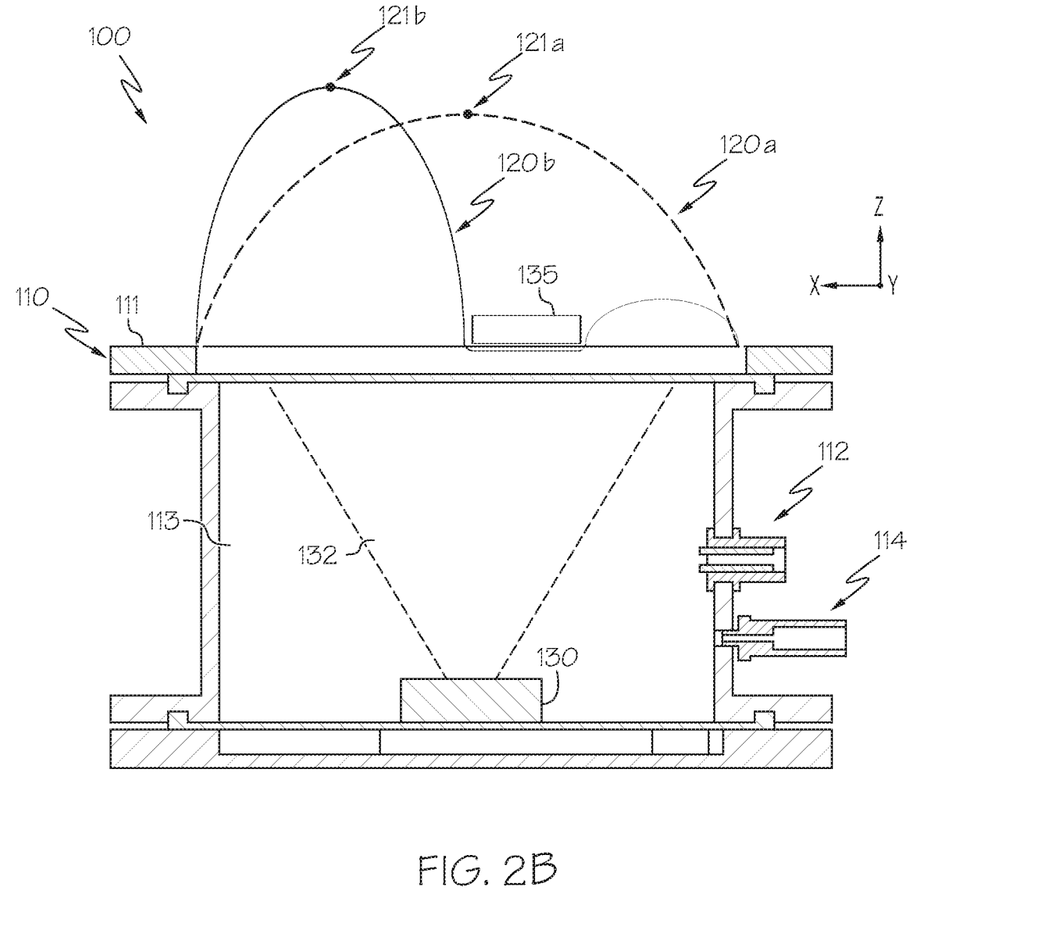
FIG. 2B schematically depicts a cross-section view of an example deformable sensor having a deformable membrane contacted by a contact mechanism, according to one or more embodiments described and illustrated herein.

Turning to FIG. 2B, an illustrative example of the contact mechanism 135 positioned in contact with the deformable membrane 120 is depicted. More specifically, FIG. 2B depicts the change in the high flex point 121 (i.e., 121a and 121b) in response to the contact mechanism 135 moving into contact with the deformable membrane 120. That is, deformable membrane 120a depicts the state of the deformable membrane 120a when the contact mechanism 135 does not contact the deformable membrane 120a. As shown, deformable membrane 120a has a high flex point 121a (i.e., the location on the deformable membrane that is farthest from the plane formed by the upper portion 111 of the housing 110) that is generally centrally positioned at the apex of the dome shape defining the deformable membrane 120a. When the contact mechanism 135 is moved into contact with the deformable membrane 120, then the shape of the deformable membrane changes, for example to having a shaped defined by deformable membrane 120b. For example, the new high flex point 121b has moved away from the housing 110, that is, the distance from the upper portion 111 of the housing 110 to the high flex point 121b has increased in the Z-direction (or vertical direction). In other words, the second location of the high flex point 121b of the deformable membrane 120b is a greater distance from the housing 110 than the first location of the high flex point 121a of the deformable membrane 120a.

It should be understood that deformable membrane 120a and deformable membrane 120b depict the same deformable membrane 120 but at different deformation states. That is, deformable membrane 120a depicts a shape of the deformable membrane 120 when not in contact with the contact mechanism 135. Whereas, deformable membrane 120b depicts a shape of the deformable membrane 120 when in contact with the contact mechanism 135.

In some embodiments, the contact mechanism may also cause the high flex point 121a to shift in the X-direction (or lateral direction) to a new high flex point 121b when the contact mechanism 135 is moved into contact with the deformable membrane 120.

In embodiments, as contact between the contact mechanism 135 and the deformable membrane 120b increases the tension of the deformable membrane 120b may increase. In other words, the deformable membrane 120b may become more resistant to deformation. Conversely, as contact between the contact mechanism 135 and the deformable membrane 120b decreases (contact mechanism 135 moves away from the deformable membrane 120b) the tension of the deformable membrane 120b may decrease. In other words, the deformable membrane 120b may become more susceptible to deformation.

Figure 3A:
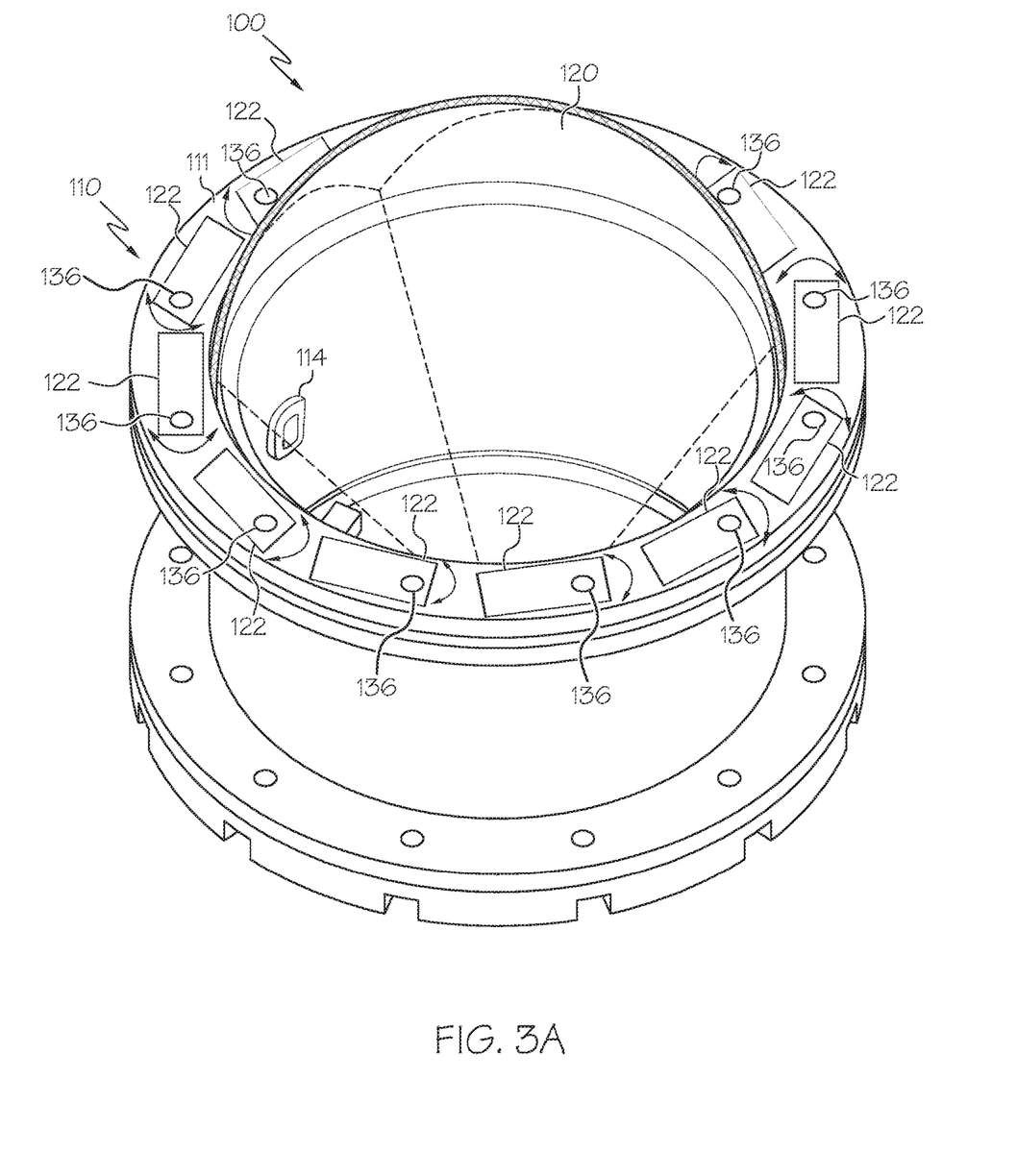
FIG. 3A schematically depicts a top perspective view of the example deformable sensor depicted by FIG. 1, according to one or more embodiments described and illustrated herein.
Figure 3B:
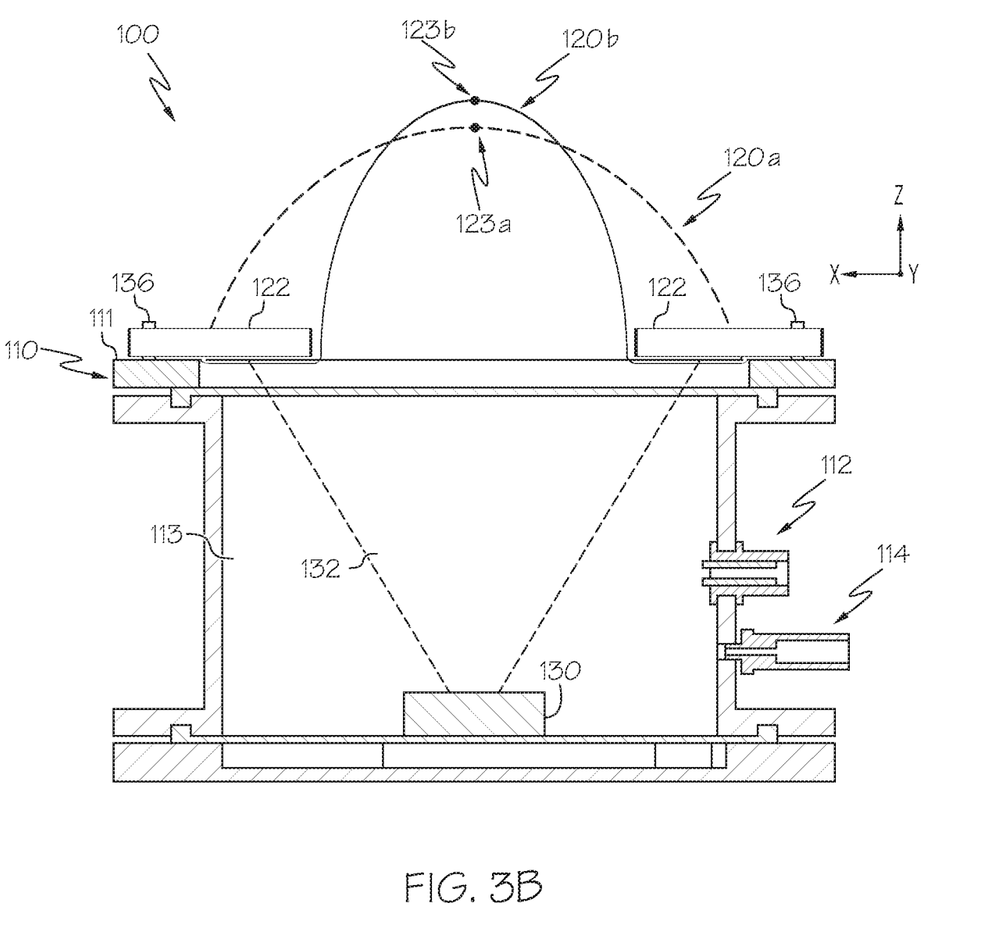
FIG. 3B schematically depicts a cross-section view of an example deformable sensor having a deformable membrane contacted by another example contact mechanism, according to one or more embodiments described and illustrated herein.

Turning now to FIGS. 3A and 3B, another illustrative example of a deformable sensor 100 having a plurality of contact mechanisms 122 for adjusting the high flex point and/or the tension of the deformable membrane 120 is depicted. The present embodiment includes a plurality of contact mechanisms 122 (also referred to herein as "a plurality of shutter levers") positioned on the upper portion 111 of the housing 110 of the deformable sensor 100. Each of the plurality of shutter levers 122 may be coupled to an electromechanical control mechanism 136 which controls the movement of the plurality of shutter levers 122. Each of the plurality of shutter levers 122 may be independently adjusted to customize the vertical and lateral location of the high flex point 123b of the deformable membrane 120b.

FIG. 3B an illustrative example of the deformable sensor 100 having a plurality of shutter levers 122 moved into contact with the deformable membrane 120b. More specifically FIG. 3B depicts the change in the high flex point 123 (i.e., 123a and 123b) in response to contact of the plurality of shutter levers 122 (i.e., contact mechanisms 122) and the deformable membrane 120. That is, deformable membrane 120a depicts the state of the deformable membrane 120a when the plurality of shutter levers 122 are not in contact with the deformable membrane 120a. As such, deformable membrane 120a has a high flex point 123a that is generally centrally positioned at the apex of the dome shape defining the deformable membrane 120a. When selected ones of the plurality of shutter levers 122 are moved into contact with the deformable membrane 120, then the shape of the deformable membrane changes, for example, to a shaped defined by deformable membrane 120b. In the embodiment depicted in FIG. 3B, the high flex point 123b has moved away from the housing 110, that is the distance from the upper portion 111 of the housing 110 to the high flex point 121b has increased in the Z-direction (or vertical direction). In other words, the second location of the high flex point 121b of the deformable membrane 120b is a greater distance from the housing 110 than the first location of the high flex point 121a of the deformable membrane 120a.

Furthermore, in some embodiments, as the number of the plurality of shutter levers 122 in contact with the deformable membrane 120b increases, the tension of the deformable membrane 120b may increase. In other words, the deformable membrane 120b may become more resistant to deformation. Conversely, as the number of the plurality of shutter levers 122 in contact with the deformable membrane 120b decreases (contact mechanisms 122 moves away from the deformable membrane 120b) the tension of the deformable membrane 120b may decrease. In other words, the deformable membrane 120b may become more susceptible to deformation.

The implementation of a plurality of shutter levers 122 as opposed to an elongated lever 135 may provide additional flexibility in configuring the location of the high flex point of the deformable membrane 120 and/or the level of tension of the deformable membrane 120. It should be understood that implementation of one or more contact mechanisms 122 or 135 provide the ability to customize or tailor the shape of the deformable membrane 120 to improve tactile manipulation maneuvers such as manipulating or lifting irregularly shaped objects or low profile objects with respect to the surface they are support by. Furthermore, the tension of the deformable membrane may be adjusted without the need to increase the pressure within the deformable sensor. Increased tension of the deformable membrane may also allow the membrane to more closely conform to the shape of an object 215 (FIG. 5) in contact with the deformable sensor 100 which in turn may allow the internal sensor 130 to output a more detailed determination of the geometry of the object 215.

Figure 5:
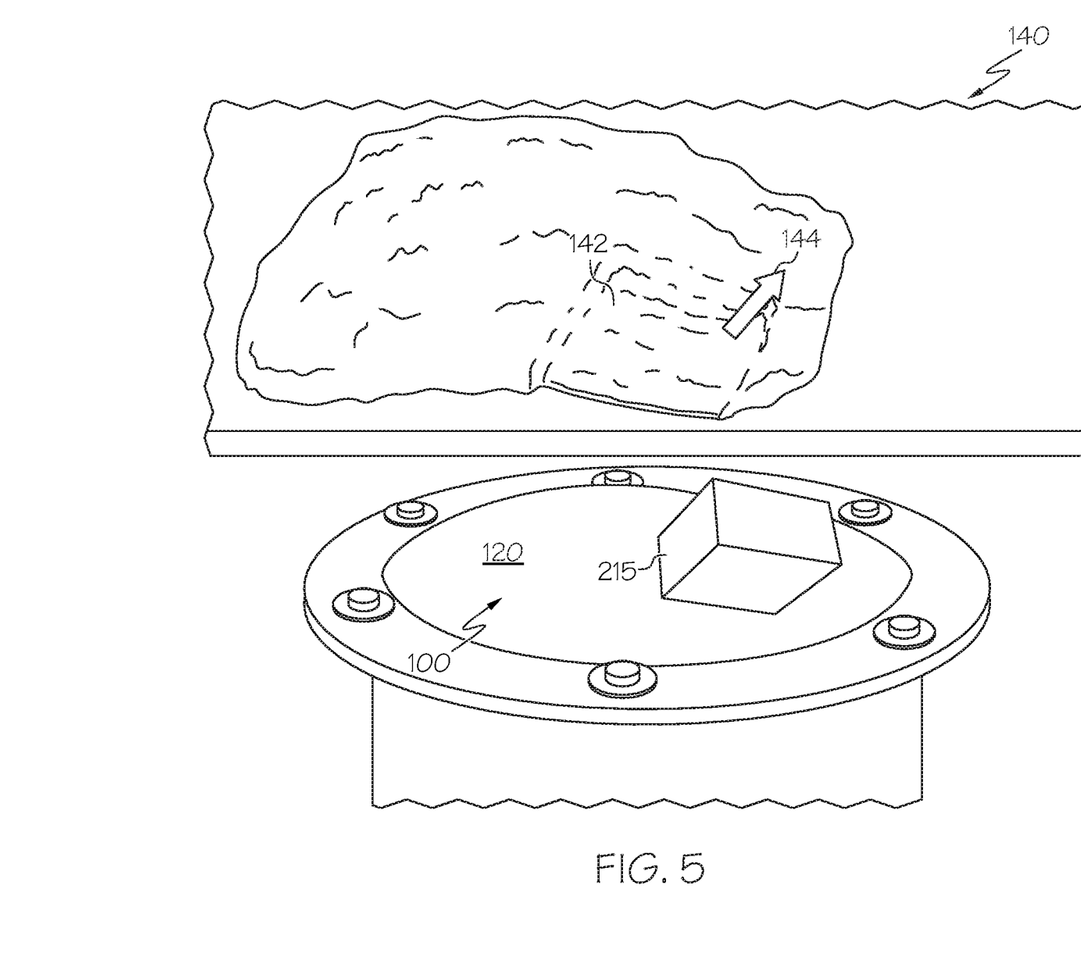
FIG. 5 is an image depicting an output of a deformable sensor on an electronic display, according to one or more embodiments described and illustrated herein.

Turning now to FIG. 5, an image, for example, captured by the internal sensor 130 of the deformable sensor 100, of an example object 215 displacing the deformable membrane 120 of the example deformable sensor 100 is depicted. In the illustrated embodiment, a display device 140 outputs for display on a device, output of the deformable sensor 100 in real time as an object 215 contacts and/or deforms the deformable membrane 120. It should be understood that the display device 140 is provided for illustrative purposes only, and that embodiments may be utilized without a display device. As the object 215 is pressed into the deformable membrane 120, the object 215 imparts its shape into the deformable membrane 120 such that the deformable membrane 120 conforms to the shape of the object 215. The spatial resolution of the internal sensor 130 may be such that the internal sensor 130 detects the geometry and/or pose of the displaced deformable membrane 120. For example, when the internal sensor 130 is a time-of-flight sensor, the optical signal that is reflected off of the bottom surface of the deformable membrane 120 that is being deflected by the object has a shorter time-of-flight than the optical signal that is reflected by the deformable membrane 120 at a region outside of the deflected region. Thus, a contact region 142 (or displaced region, used herein interchangeably) having a geometry and/or pose matching the shape of the object 215 may be outputted and displayed on the display device 140.

The deformable sensor 100 therefore not only may detect the presence of contact with the object 215, but also the geometry of the object 215. In this manner, a robot equipped with a deformable sensor 100 may determine the geometry of an object based on contact with the object. Additionally, a geometry and/or pose of the object 215 may also be determined based on the geometric information sensed by the deformable sensor 100. For example, a vector 144 that is normal to a surface in the contact region 142 may be displayed, such as when determining the pose of the object 215. The vector 144 may be used by a robot or other device to determine which direction a particular object 215 may be oriented, for example. It should also be understood that embodiments of the contact mechanism are not limited to the specific examples provided herein as these are merely illustrative. Other types and forms of contact mechanisms may be implemented to achieve variable geometries and/or tensions of the deformable membrane. For example, some embodiments may include contact mechanism implement within the deformable sensor to achieve variable geometries and/or tensions of the deformable membrane. One such example, may be a contact mechanism that is coupled to the inside surface of the deformable membrane, which can be adjusted to change the high flex point of the deformable membrane.

Figure 6:
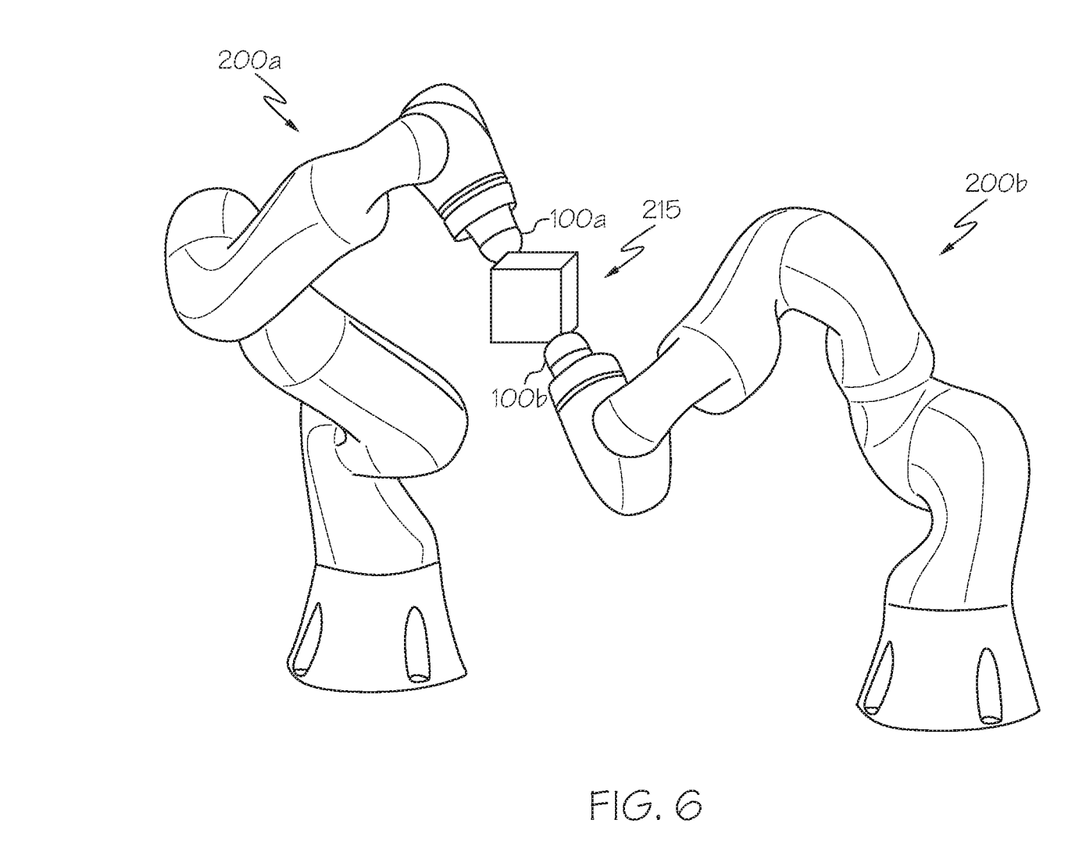
FIG. 6 schematically depicts two example robots each having a deformable sensor and manipulating an object according to one or more embodiments described and illustrated herein.

FIG. 6 schematically depicts an example non-limiting first robot 200a having a first deformable sensor 100a and an example second robot 200b having a second deformable sensor 100b. In this illustrated example, the first robot 200A and the second robot 200B may cooperate for dual arm manipulation wherein both the first deformable sensor 100A and the second deformable sensor 100b contact the object 215. As stated above, the deformable sensors 100 described herein may be used as an end effector of a robot to manipulate an object. The deformable sensor 100 may allow a robot to handle an object 215 that is fragile due to the flexible nature of the deformable membrane 120. Further, the deformable sensor 100 may be useful for robot-to-human contact because in some embodiments the deformable membrane 120 may be softer and/or more flexible/deformable, rather than rigid (non-deformable or nearly so) to the touch. However, as described herein the tension or deformability of the deformable membrane 120 may be adjusted using contact mechanism 122 or 135 brought into contact with the deformable membrane 120.

In addition to geometry and pose estimation, the deformable sensor 100 may be used to determine how much force a robot 200a (or other device) is exerting on the target object 215. Although reference is made to first robot 200a, any such references may in some embodiments utilize second robot 200b, any other suitable devices, and/or any combinations thereof. This information may be used by the robot 200a to more accurately grasp objects 215. For example, the displacement of the deformable membrane 120 may be modeled. The model of the displacement of the deformable membrane 120 may be used to determine how much force is being applied to the target object 215. The determined force as measured by the displacement of the deformable membrane 120 may then be used to control a robot 200a to more accurately grasp objects 215. As an example, the amount of force a robot 200a (discussed in more detail below) applies to a fragile object 215 may be of importance so that the robot 200a does not break the object 215 that is fragile. In some embodiments an object 215 may be assigned a softness value (or fragility value), where the robot 200a may programmed to interact with all objects 215 based upon the softness value (which may be received at a processor, for example, from a database, server, user input, etc.). In some embodiments a user interface may be provided to specify any suitable value (pressure within the deformable sensor 100 FIG. 1, softness value pertaining to an object 215, etc.) for initialization and/or updating (such as on a display device depicted in 140 FIG. 4, 1204 FIG. 12, etc.). In other embodiments a robot 200a may be able to identify specific objects 215 (such as via object recognition in a vision system, etc.) whereby the softness value may be modified, which may lead to utilization of another deformable sensor 100 having a more suitable deformability, aggregate spatial resolution, depth resolution, pressure, and/or material for the deformable membrane 120. In some embodiments a processor in a robot 200a may from the internal sensor 130 receive data representing the contact region 142. In various embodiments, a processor in a robot 200a may determine a vector 144 normal to a surface of the object 215 based on the data representing the contact region 142 and utilize the vector 144 to determine which direction the object 215 is oriented.

Figure 7:
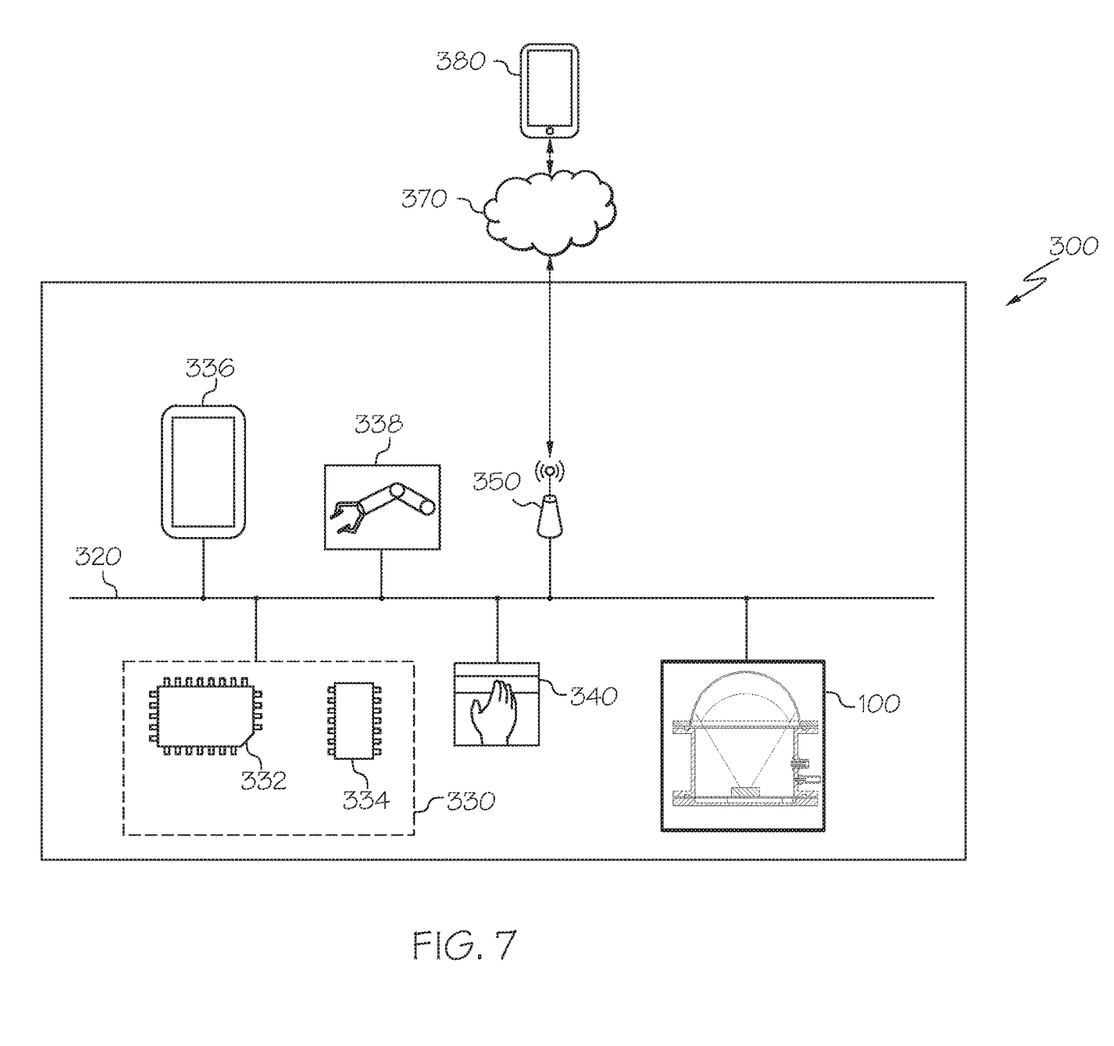
FIG. 7 is a block diagram illustrating hardware utilized in the system for adjusting the high flex point of a deformable membrane of a deformable sensor, according one or more embodiments described and illustrated herein.

Turning now to FIG. 7, example components of one non-limiting embodiment of a system 300 is schematically depicted. The system 300 includes a communication path 320, an electronic control unit 330 having a processor 332 and a memory module 334, a display device 336, a robotic arm 338, one or more input devices 340, a deformable sensor 100, and network interface hardware 350. The various components of the system 300 and the interaction thereof will be described in detail below. It is understood that other embodiments of the system 300 may include additional components.

The communication path 320 may be formed from any medium that is capable of transmitting a signal such as, for example, conductive wires, conductive traces, optical waveguides, or the like. Moreover, the communication path 320 may be formed from a combination of mediums capable of transmitting signals. In one embodiment, the communication path 320 comprises a combination of conductive traces, conductive wires, connectors, and buses that cooperate to permit the transmission of electrical data signals to components such as processors, memories, sensors, input devices, output devices, and communication devices. Accordingly, the communication path 320 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 320 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

The electronic control unit 330 may be any device or combination of components comprising a processor 332 and the memory component 334. The processor 332 of the system 300 may be any device capable of executing the machine-readable instruction set stored in the memory component 334. Accordingly, the processor 332 may be an electric controller, an integrated circuit, a microchip, a field programmable gate array, a computer, or any other computing device. The processor 332 is communicatively coupled to the other components of the system 300 by the communication path 320. Accordingly, the communication path 320 may communicatively couple any number of processors 332 with one another, and allow the components coupled to the communication path 320 to operate in a distributed computing environment. Specifically, each of the components may operate as a node that may send and/or receive data. While the embodiment depicted in FIG. 7 includes a single processor 332, other embodiments may include more than one processor 332.

The memory component 334 of the system 300 is coupled to the communication path 320 and communicatively coupled to the processor 332. The memory component 334 may be a non-transitory computer readable memory and may comprise RAM, ROM, flash memories, hard drives, or any non-transitory memory device capable of storing machine-readable instructions such that the machine-readable instructions can be accessed and executed by the processor 332. The machine-readable instruction set may comprise logic or algorithm(s) written in any programming language of any generation (e.g., 1GL, 2GL, 3GL, 4GL, or 5GL) such as machine language that may be directly executed by the processor 332, or assembly language, object-oriented programming (OOP), scripting languages, microcode, etc., that may be compiled or assembled into machine readable instructions and stored in the memory component 334. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the system 300 depicted in FIG. 7 includes a single memory component 334, other embodiments may include more than one memory components 334.

Still referring to FIG. 7, the system 300 includes a display device 336 for providing a visual output, for example, to project road-scene video data to a viewer. The display device 336 is coupled to the communication path 320. Accordingly, the communication path 320 communicatively couples the display device 336 with other modules of the system 300. The display device 336 may include any medium capable of transmitting an optical output such as, for example, a cathode ray tube, light emitting diodes, a liquid crystal display, a plasma display, or the like. Additionally, the display device 336 may be the display device 336 of a portable personal device such as a smart phone, tablet, laptop or other electronic device. Furthermore, the display device 336 may be a television display mounted on a stand or on a wall to project a road-scene video data to a viewer. Additionally, it is noted that the display device 336 can include one or more processors 332 and one or more memory components 334. While the system 300 includes a display device 336 in the embodiment depicted in FIG. 7, the system 300, may not include a display device 336.

Still referring to FIG. 7, a robotic arm 338, is coupled to the communication path 320 and communicatively coupled to the electronic control unit 330. The robotic arm 338 may comprise multiple mechanical segments linked together by servos, actuators or other types of joint forming a kinematic chain. One end of the robotic arm 338 may include an end effector for collecting items. The end effector may comprise a deformable sensor 100. An opposing end of the robotic arm 338 may be mounted to a robot or housing (not shown). The electronic control unit 330 which is communicatively coupled to the robotic arm 338 provides commands in the form of signals to the robotic arm 338 to manipulate its movement. For example, the electronic control unit 330 using image data from the one or more cameras may provide signals to the robotic arm 338 to navigate the end effector proximate an item, collect the item and then navigate the robotic arm 338 and end effector proximate a location in the holding container for placing the item. The robotic arm 338 is intended to simulate similar actions to that of a human arm and hand preforming similar activities.

Still referring to FIG. 7, one or more input devices 340 are coupled to the communication path 320 and communicatively coupled to the processor 332. The input device 340 may be any device capable of transforming user contact into a data signal that can be transmitted over the communication path 320 such as, for example, a button, a switch, a knob, a microphone or the like. In various embodiments, an input device 340 may be a deformable sensor 100 and/or an internal sensor 130 as described above. In some embodiments, the input device 340 includes a power button, a volume button, an activation button, a scroll button, or the like. The one or more input devices 340 may be provided so that the user may interact with the system 300, such as to navigate menus, make selections, set preferences, and other functionality described herein. In some embodiments, the input device 340 includes a pressure sensor, a touch-sensitive region, a pressure strip, or the like. It should be understood that some embodiments may not include the input device 340. In some embodiments, one or more of the input devices 340 are configured as a fingerprint sensor for unlocking the system 300. For example, only a user with a registered fingerprint may unlock and use the system 300.

The network interface hardware 350 is coupled to the communication path 320 and communicatively coupled to the processor 332. The network interface hardware 350 may be any device capable of transmitting and/or receiving data via a network 370. Accordingly, network interface hardware 350 can include a wireless communication module configured as a communication transceiver for sending and/or receiving any wired or wireless communication. For example, the network interface hardware 350 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 350 includes hardware configured to operate in accordance with the Bluetooth wireless communication protocol. In another embodiment, network interface hardware 350 may include a Bluetooth send/receive module for sending and receiving Bluetooth communications to/from a portable electronic device 380. The network interface hardware 350 may also include a radio frequency identification ("RFID") reader configured to interrogate and read RFID tags.

In some embodiments, the system 300 may be communicatively coupled to a portable electronic device 380 via the network 370. In some embodiments, the network 370 is a personal area network that utilizes Bluetooth technology to communicatively couple the system 300 and the portable electronic device 380. In other embodiments, the network 370 may include one or more computer networks (e.g., a personal area network, a local area network, or a wide area network), cellular networks, satellite networks and/or a global positioning system and combinations thereof. Accordingly, the system 300 can be communicatively coupled to the network 370 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 7, as stated above, the network 370 may be utilized to communicatively couple the system 300 with the portable electronic device 380. The portable electronic device 380 may include a mobile phone, a smartphone, a personal digital assistant, a camera, a dedicated mobile media player, a mobile personal computer, a laptop computer, and/or any other portable electronic device capable of being communicatively coupled with the system 300. The portable electronic device 380 may include one or more processors and one or more memories. The one or more processors can execute logic to communicate with the system 300. The portable electronic device 380 may be configured with wired and/or wireless communication functionality for communicating with the system 300. In some embodiments, the portable electronic device 380 may perform one or more elements of the functionality described herein, such as embodiments in which the functionality described herein is distributed between the system 300 and the portable electronic device 380.

It should now be understood that embodiments of the present disclosure are directed to devices, systems, and method of varying the geometry, the high flex point, and/or the tension of a deformable membrane of a deformable sensor. For example, a deformable sensor may include an enclosure comprising a housing and a deformable membrane coupled to an upper portion of the housing, where the enclosure is configured to be filled with a medium, a contact mechanism coupled to the housing and selectively adjustable such that adjusting a position of the contact mechanism causes a change in a location of a high flex point of the deformable membrane, and an internal sensor, disposed within the enclosure, having a field of view configured to be directed through the medium and toward a bottom surface of the deformable membrane, where the internal sensor is configured to output a deformation region within the deformable membrane when placed in contact an object.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor comprising:
an enclosure comprising a housing and a deformable membrane coupled to an upper portion of the housing, the enclosure configured to be filled with a medium; and
a contact mechanism coupled to the upper portion of the housing and selectively adjustable such that adjusting a position of the contact mechanism causes the contact mechanism to move into or out of contact with the deformable membrane thereby changing a location of a high flex point of the deformable membrane.

2. The deformable sensor of claim 1, wherein the contact mechanism comprises an elongated lever having a first end rotatably coupled to the upper portion of the housing and an elongated portion selectively positionable to contact the deformable membrane such that the high flex point of the deformable membrane moves from a center location.

3. The deformable sensor of claim 1, wherein adjusting the position of the contact mechanism causes the high flex point of the deformable membrane to move away from the housing.

4. The deformable sensor of claim 1, wherein adjusting the position of the contact mechanism causes the high flex point of the deformable membrane to move closer to the housing.

5. The deformable sensor of claim 1, wherein adjusting the position of the contact mechanism causes a change in a tension of the deformable membrane.

6. The deformable sensor of claim 1, further comprising an electromechanical control mechanism coupled to the contact mechanism and the housing, wherein a control signal received by the electromechanical control mechanism causes the contact mechanism to move such that the high flex point of the deformable membrane moves from a first location to a second location.

7. The deformable sensor of claim 1, wherein the contact mechanism comprises a plurality of shutter levers coupled to the upper portion of the housing such that each of the plurality of shutter levers are positioned to contact a distinct portion of the deformable membrane.

8. The deformable sensor of claim 7, wherein adjusting the position of selected shutter levers of the plurality of shutter levers causes the high flex point of the deformable membrane to move from a first location to a second location, wherein the first location is different than the second location.

9. The deformable sensor of claim 8, wherein the second location of the high flex point of the deformable membrane is a greater distance from the housing than the first location of the high flex point of the deformable membrane.

10. The deformable sensor of claim 8, wherein the second location of the high flex point of the deformable membrane is closer to the housing than the first location of the high flex point of the deformable membrane.

11. A system for adjusting a high flex point of a deformable sensor comprising:
an enclosure comprising a housing and a deformable membrane coupled to an upper portion of the housing, the enclosure configured to be filled with a medium;
a contact mechanism coupled to the upper portion of the housing and selectively adjustable such that adjusting a position of the contact mechanism causes the contact mechanism to move into or out of contact with the deformable membrane thereby changing a location of a high flex point of the deformable membrane;
an electromechanical control mechanism coupled to the contact mechanism and the housing, wherein the electromechanical control mechanism causes the contact mechanism to move; and
an electronic control unit communicatively coupled to the contact mechanism, wherein the electronic control unit is configured to:

generate a control signal for controlling the electromechanical control mechanism; and transmit the control signal to the electromechanical control mechanism, wherein the control signal causes the electromechanical control mechanism to adjust the position of the contact mechanism such that adjusting the position of the contact mechanism causes the high flex point of the deformable membrane to move from a first location to a second location.

12. The system of claim 11, wherein the second location of the high flex point of the deformable membrane is a greater distance from the housing than the first location of the high flex point of the deformable membrane.

13. The system of claim 11, wherein the second location of the high flex point of the deformable membrane is closer to the housing than the first location of the high flex point of the deformable membrane.

14. The system of claim 11, wherein adjusting the position of the contact mechanism causes a change in a tension of the deformable membrane.

15. The system of claim 11, wherein the contact mechanism comprises an elongated lever having a first end rotatably coupled to the upper portion of the housing and an elongated portion selectively positionable to contact the deformable membrane such that the high flex point of the deformable membrane moves from a center location.

16. The system of claim 11, wherein the contact mechanism comprises a plurality of shutter levers coupled to the upper portion of the housing such that each of the plurality of shutter levers are positioned to contact a distinct portion of the deformable membrane when moved into contact with the deformable membrane.

17. The system of claim 16, wherein adjusting the position of selected shutter levers of the plurality of shutter levers causes the high flex point of the deformable membrane to move from a first location to a second location.

18. The system of claim 17, wherein the second location of the high flex point of the deformable membrane is a greater distance from the housing than the first location of the high flex point of the deformable membrane.

19. The system of claim 17, wherein the second location of the high flex point of the deformable membrane is closer to the housing than the first location of the high flex point of the deformable membrane.

20. The system of claim 11, further comprising an internal sensor, disposed within the enclosure, having a field of view configured to be directed through the medium and toward a bottom surface of the deformable membrane, wherein the internal sensor is configured to output a deformation region within the deformable membrane as a result of contact with the object.

* * * * *

UNITED STATES PATENT AND TRADEMARK OFFICE
CERTIFICATE OF CORRECTION

| | | |
|---|---|---|
| PATENT NO. | : 11,408,788 B2 | Page 1 of 1 |
| APPLICATION NO. | : 16/836390 | |
| DATED | : August 9, 2022 | |
| INVENTOR(S) | : Alexander Alspach, Naveen Suresh Kuppuswamy and Avinash Uttamchandani | |

It is certified that error appears in the above-identified patent and that said Letters Patent is hereby corrected as shown below:

On the Title Page

Item (56), Other Publications, cite no. 1, delete "Pulbished" and insert --Published--, therefor.

Item (57), abstract, Line(s) 15, after "contact", insert --with--.

In the Specification

In Column 1, Line(s) 47, after "contact", insert --with--.

In Column 6, Line(s) 14, delete "positonable" and insert --positionable--, therefor.

In Column 13, Line(s) 23, after "contact", insert --with--.

Signed and Sealed this
Eighth Day of November, 2022

Katherine Kelly Vidal
*Director of the United States Patent and Trademark Office*